US009722892B2

(12) United States Patent
Yoshida

(10) Patent No.: US 9,722,892 B2
(45) Date of Patent: Aug. 1, 2017

(54) FLOW RATE PREDICTION DEVICE, FLOW RATE PREDICTION METHOD, AND FLOW RATE PREDICTION PROGRAM

(71) Applicant: NEC Corporation, Minato-ku, Tokyo (JP)

(72) Inventor: Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/411,979

(22) PCT Filed: Jun. 28, 2013

(86) PCT No.: PCT/JP2013/067848
§ 371 (c)(1),
(2) Date: Dec. 30, 2014

(87) PCT Pub. No.: WO2014/007166
PCT Pub. Date: Jan. 9, 2014

(65) Prior Publication Data

US 2015/0180740 A1 Jun. 25, 2015

(30) Foreign Application Priority Data

Jul. 2, 2012 (JP) ................................ 2012-148284

(51) Int. Cl.
*H04L 12/26* (2006.01)
*H04L 12/911* (2013.01)
(Continued)

(52) U.S. Cl.
CPC .............. *H04L 43/04* (2013.01); *G06F 17/18* (2013.01); *H04L 41/142* (2013.01);
(Continued)

(58) Field of Classification Search
None
See application file for complete search history.

(56) References Cited

U.S. PATENT DOCUMENTS 7,716,022 B1 * 5/2010 Park ...................... G06Q 10/10 702/181
2003/0125887 A1 * 7/2003 Ogawa .................... G01D 1/14 702/66

(Continued)

FOREIGN PATENT DOCUMENTS

JP 6-175996 A 6/1994
JP 2006-129277 A 5/2006
WO WO2011/161900 * 12/2011 ............ G06F 17/30

OTHER PUBLICATIONS

International Search Report for PCT Application No. PCT/JP2013/067848, mailed on Oct. 1, 2013.

(Continued)

*Primary Examiner* — Kodzovi Acolatse

(57) ABSTRACT

A flow rate prediction device to predict a flow rate determines, based on time-series data of a measured flow rate, whether the state of the flow rate is stationary or non-stationary. The flow rate prediction device identifies a stochastic process model defining the flow rate as a stochastic variable based on the result of determination of whether the state is stationary or non-stationary and calculates a parameter for use in the identified stochastic process model based on the time-series data. The flow rate prediction device calculates a probability distribution function or a probability density function defining the flow rate to be predicted as the stochastic variable based on the identified stochastic process model and the parameter.

11 Claims, 19 Drawing Sheets

CONNECTED TO IP NETWORK 200
THROUGHPUT PREDICTION DEVICE
100
COMMUNICATION THROUGHPUT MEASURING UNIT
101
STATIONARITY DETERMINING UNIT
102
PREDICTION MODEL IDENTIFYING UNIT
103
STOCHASTIC DIFFUSION CALCULATING UNIT
104
OUTPUT TO OUTSIDE OR INSIDE

(51) Int. Cl.
*G06F 17/18* (2006.01)
*H04W 24/08* (2009.01)
*H04L 12/24* (2006.01)

(52) U.S. Cl.
CPC ........ *H04L 43/0894* (2013.01); *H04L 47/823* (2013.01); *H04W 24/08* (2013.01)

(56) References Cited

U.S. PATENT DOCUMENTS

2010/0130206 A1* 5/2010 Chin ..................... H04W 36/30
455/436
2013/0091137 A1* 4/2013 Aust ................ G06F 17/30705
707/737

OTHER PUBLICATIONS

Hiroshi Yoshida, Kozo Satoda, Satoshi Nogaki, "Video Streaming Control by Predicting Stochastic Diffusion of TCP Throughput", Collected Papers of Internet Conference 2011 (IC2011), Oct. 2011, pp. 57-66, with English Abstract.

Kumar, K., and Jain, V. K., "Autoregressive integrated moving averages (ARIMA) modelling of a traffic noise time series", Applied Acoustics, 58(3), 1999, 283-294, with English Abstract.

* cited by examiner

Fig.5

| T | 1% POINT | 5% POINT | 10% POINT | AVERAGE | STANDARD DEVIATION |
|---|---|---|---|---|---|
| 25 | −3.73 | −3.32 | −2.99 | −1.52 | 0.90 |
| 50 | −3.57 | −3.22 | −2.93 | −1.53 | 0.87 |
| 100 | −3.50 | −3.17 | −2.90 | −1.53 | 0.86 |
| 500 | −3.45 | −3.14 | −2.87 | −1.53 | 0.84 |
| 100000 | −3.44 | −3.13 | −2.87 | −1.53 | 0.84 |

FLOW RATE PREDICTION DEVICE, FLOW RATE PREDICTION METHOD, AND FLOW RATE PREDICTION PROGRAM

This application is a National Stage Entry of PCT/JP2013/067848 filed on Jun. 28, 2013, which claims priority from Japanese Patent Application 2012-148284 filed on Jul. 2, 2012, the contents of all of which are incorporated herein by reference, in their entirety.

FIELD

The present disclosure relates to a flow rate prediction device, a flow rate prediction method, and a flow rate prediction program that predict a flow rate.

BACKGROUND

Widely known are communication throughput prediction devices that predict a communication throughput, which is a data size (an amount of data) distributed (transmitted) per unit time via a communication network.

Examples of the communication throughput prediction devices include a communication device described in Patent Literature 1. The communication device described in Patent Literature 1 is a server device that distributes video stream data, for example. The server device predicts a communication throughput without requiring feedback from a receiving terminal and distributes video stream data at a rate corresponding to the predicted communication throughput. By using the predicted communication throughput, the server device can prevent reproduction from stopping, reliably distribute the video data, and increase the video quality as much as possible. As described above, prediction of the communication throughput may be used for various purposes.

Non Patent Literature 1 describes an example of a method for predicting a communication throughput used by the communication throughput prediction devices of this type.

The method for predicting a communication throughput described in Non Patent Literature 1 turns fluctuations in the communication throughput into a Brownian motion model with drift. The method then estimates the drift and dispersion serving as parameters of the obtained model from time-series data of the communication throughput for a certain past period. Because Non Patent Literature 1 refers to the estimation as a term "identification", the description below also uses the term "identification" in the same meaning.

The method for predicting a communication throughput described in Non Patent Literature 1 then calculates probability distribution (probability density function) of a prospective communication throughput based on the identified model, thereby calculating stochastic spread (stochastic diffusion) of the prospective communication throughput based on the calculated probability density function.

CITATION LIST

Patent Literature

Patent Literature 1: Japanese Patent Application Laid-open No. 2006-129277

Non Patent Literature

Non Patent Literature 1: Hiroshi Yoshida, Kozo Satoda, Satoshi Nogaki, "Video Streaming Control by Predicting Stochastic Diffusion of TCP Throughput", Collected Papers of Internet Conference 2011 (IC2011), pp. 57-66, October 2011

SUMMARY

Technical Problem

The communication throughput fluctuates because of various factors. In communications based on the Transmission Control Protocol/Internet Protocol (TCP/IP), for example, the communication throughput fluctuates every moment because of a complex interaction of various factors, such as presence of End-to-End delay, occurrence of packet loss, an influence of cross traffic, and fluctuations in the radio field intensity in wireless communications.

Even if the fluctuations are unstable and has high randomness, the use of the Brownian motion model makes it possible to predict the stochastic diffusion of the communication throughput at high accuracy as described in Non Patent Literature 1.

An actual communication throughput, however, does not fluctuate completely randomly like the Brownian motion. In particular, in a case where the factors affecting the fluctuations in the communication throughput are stable, the communication throughput is also stable without fluctuating perfectly randomly.

In this case, the fluctuations in the communication throughput significantly differ from those in the Brownian motion, resulting in reduced accuracy in prediction of the stochastic diffusion of the communication throughput. This is because the Brownian motion is a stochastic process model having completely irregular fluctuations and the use of it leads to overprediction of the stochastic diffusion of the communication throughput.

In other words, typical technologies including the technology in Non Patent Literature 1 have a problem in that the prediction accuracy is reduced depending on whether the communication throughput is stable or unstable.

It is an exemplary object of the present invention to provide a flow rate prediction device, a flow rate prediction method, and a flow rate prediction program that can predict stochastic diffusion of a communication throughput at high accuracy regardless of the state of the communication throughput.

Solution to Problem

A first exemplary aspect according to the present invention provides a flow rate prediction device including a stationarity determining unit that determines, based on time-series data of a measured flow rate, whether a state of the flow rate is stationary or non-stationary, a prediction model identifying unit that identifies a stochastic process model defining the flow rate as a stochastic variable based on a result of determination made by the stationarity determining unit and calculates a parameter for use in the identified stochastic process model based on the time-series data, and a stochastic diffusion calculating unit that calculates a probability distribution function or a probability density function defining the flow rate to be predicted as the stochastic variable based on the stochastic process model identified by the prediction model identifying unit and the parameter calculated by the prediction model identifying unit.

A second exemplary aspect according to the present invention provides a flow rate prediction method including a stationarity determining step of determining, based on time-series data of a measured flow rate, whether a state of the flow rate is stationary or non-stationary, a prediction model identifying step of identifying a stochastic process model defining the flow rate as a stochastic variable based on a result of determination made in the stationarity determining step and calculating a parameter for use in the identified stochastic process model based on the time-series data, and a stochastic diffusion calculating step of calculating a probability distribution function or a probability density function defining the flow rate to be predicted as the stochastic variable based on the stochastic process model identified in the prediction model identifying step and the parameter calculated in the prediction model identifying step.

A third exemplary aspect according to the present invention provides a flow rate prediction program causing a computer to function as a flow rate prediction device that predicts a flow rate, the flow rate prediction program causing the computer to function as the flow rate prediction device including a stationarity determining unit that determines, based on time-series data of a measured flow rate, whether a state of the flow rate is stationary or non-stationary, a prediction model identifying unit that identifies a stochastic process model defining the flow rate as a stochastic variable based on a result of determination made by the stationarity determining unit and calculates a parameter for use in the identified stochastic process model based on the time-series data, and a stochastic diffusion calculating unit that calculates a probability distribution function or a probability density function defining the flow rate to be predicted as the stochastic variable based on the stochastic process model identified by the prediction model identifying unit and the parameter calculated by the prediction model identifying unit.

Advantageous Effects of Invention

The present invention can predict stochastic diffusion of a communication throughput at high accuracy regardless of the state of the communication throughput.

BRIEF DESCRIPTION OF DRAWINGS

FIG. 5 is a diagram of characteristic values of null distribution (with a unit root) used to explain the embodiment of the present invention.

DESCRIPTION OF EMBODIMENTS

Exemplary embodiments according to the present invention are described below in greater detail with reference to the accompanying drawings. The present invention is suitably used for prediction not only of a flow rate, such as a communication throughput, but also of any flow rate as required (e.g., a traffic volume, a liquid flow rate, and a gas flow rate). The embodiments below describe a throughput prediction device.

Figure 1:
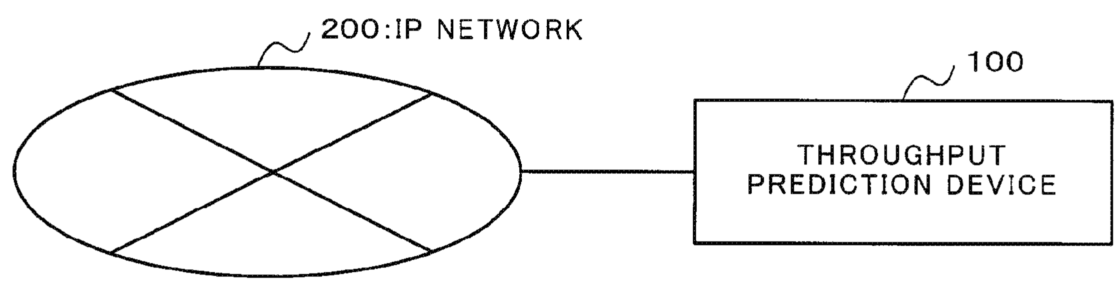
FIG. 1 is a block diagram of an entire basic configuration of an embodiment of the present invention.

FIG. 1 is a diagram of an entire system including a throughput prediction device 100 according to the present embodiment. As illustrated in FIG. 1, the throughput prediction device 100 according to the present embodiment is connected to an Internet Protocol (IP) network 200.

The throughput prediction device 100 predicts a communication throughput, which is a data size (an amount of data) distributed (transmitted) per unit time via a communication network.

The IP network 200 performs communications based on an IP and spreads worldwide by connecting various subnetworks over the world based on the IP of the third layer in the open systems interconnection (OSI) reference model. The IP network 200 includes a terminal serving as a communication partner of the throughput prediction device 100 and a relay device such as a router.

The IP network 200 may be established by wired communications, or part or the whole thereof may be established by wireless communications.

While the throughput prediction device 100 and the IP network 200 are connected via the solid line for the convenience of illustration, it is not intended to limit the communication system to a wired communication system. The throughput prediction device 100 and the IP network 200 may be connected via any wireless connection based on a desired communication system, such as High Speed Downlink Packet Access (HSDPA) and Wireless Fidelity (WiFi).

Figure 2:
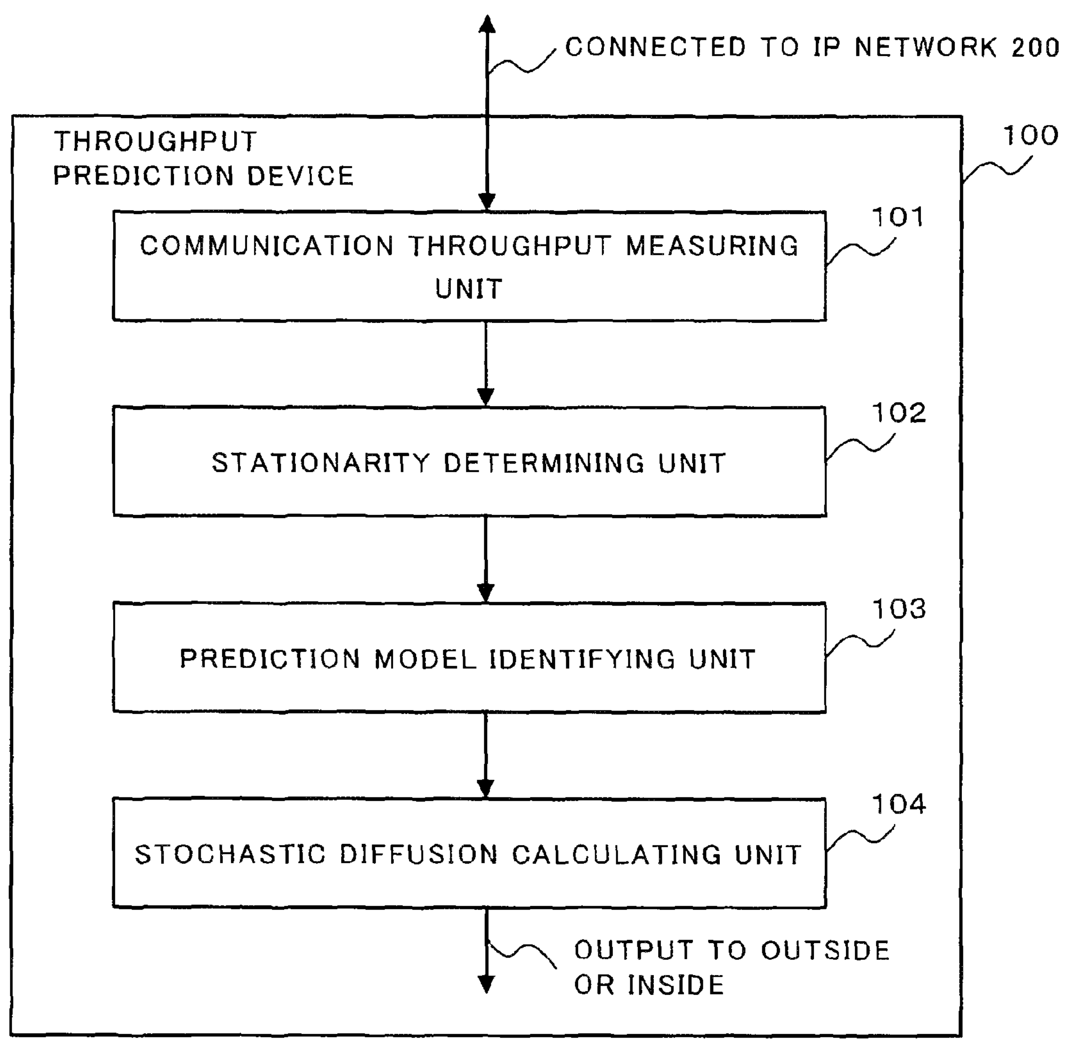
FIG. 2 is a block diagram of basic functions of a throughput prediction device according to the embodiment of the present invention.

As illustrated in FIG. 2, the throughput prediction device 100 includes a communication throughput measuring unit 101, a stationarity determining unit 102, a prediction model identifying unit 103, and a stochastic diffusion calculating unit 104.

The communication throughput measuring unit 101 measures the current communication throughput (at the present time) in data transfer. Thus, the communication throughput measuring unit 101 is connected to the IP network 200. The measured communication throughput is sequentially accumulated and held as time-series data. The held time-series data is output to the stationarity determining unit 102.

In the present embodiment, the throughput prediction device 100 may be a transmitter, a receiver, or a repeater (e.g., a router) in communications. Thus, the communication throughput measuring unit 101 can measure the communication throughput of both of received data in the receiver and transmitted data in the transmitter. The specific method for measuring the communication throughput will be described later.

The stationarity determining unit 102 uses part of the time-series data of the communication throughput measured by the communication throughput measuring unit 101, thereby determining the stationarity of the communication throughput. The stationarity and determination of the stationarity will be described later. The stationarity determining unit 102 outputs the result of determination of the stationarity to the prediction model identifying unit 103.

Based on the result of determination made by the stationarity determining unit 102, the prediction model identifying unit 103 identifies a prediction model used to predict stochastic spread (stochastic diffusion) of the communication throughput. The specific identification method will be described later. The identified prediction model is transmitted to the stochastic diffusion calculating unit 104.

Based on the prediction model identified by the prediction model identifying unit 103, the stochastic diffusion calculating unit 104 calculates stochastic diffusion. The specific calculation method will be described later. The stochastic diffusion calculating unit 104 outputs the calculation result to the outside or the inside of the throughput prediction device 100. The destination may be a storage medium outside or inside the throughput prediction device 100 or another functional unit, which is not illustrated in FIG. 2, outside or inside the throughput prediction device 100. Alternatively, the calculation result may be transmitted to a device other than the throughput prediction device 100 via a network, such as the IP network 200.

The following describes the processing performed by the communication throughput measuring unit 101, the stationarity determining unit 102, the prediction model identifying unit 103, and the stochastic diffusion calculating unit 104 in greater detail.

An explanation will be made of the method for measuring the communication throughput performed by the communication throughput measuring unit 101.

In the explanation, the throughput prediction device 100 is assumed to be a transmitter and start data transfer from the transmitter to a receiver at time 0.

St denotes the entire data size transmitted from the transmitter to the receiver until time t (t is a real number satisfying "t≥0").

xt expressed by Equation (1) is defined as a communication throughput at a time interval τ at the time t.

[Equation 1]

$$x_t = \begin{cases} \dfrac{S_t - S_{t-\tau}}{\tau} & (t \geq \tau) \\ 0 & (0 \leq t < \tau) \end{cases} \tag{1}$$

In the description below, "xt" expressed by Equation (1) is simply referred to as a "communication throughput at the time t" unless any confusion arises.

The communication throughput described above is defined based on St that can be measured by the transmitter. By replacing St with an entire data size Rt received by the receiver, it is possible to define a similar communication throughput in the receiver.

By making the definition as described above, it is possible to measure the communication throughput at a desired time t≥0.

The communication throughput measuring unit 101 measures the communication throughput at the time interval τ (time t=0, τ, 2τ, 3τ, . . . ) and holds the measurement results as time-series data (x0, xτ, x2τ, x3τ, . . . ).

While the time-series data is the communication throughput measured at the time interval τ, it may be the communication throughput measured at a desired time interval because the communication throughput can be defined as a continuous-time function. In other words, the time interval τ may be a time interval of a predetermined and desired length of time.

While the measurement results are held as time-series data, not all the time-series data is necessarily held, and the latest n (n is an integer of 1 or more) pieces of time-series data may be held, for example. In the description below, the time-series data (x0, xτ, x2τ, x3τ, . . . ) is represented by (x0, x1, x2, x3, . . . ) by omitting τ.

The stationarity determining unit 102 uses part of the time-series data of the communication throughput measured by the communication throughput measuring unit 101, thereby determining the stationarity of the communication throughput.

The following describes the stationarity of a communication throughput and terms relating thereto.

The stationarity of a communication throughput indicates whether, assuming that the communication throughput is a stochastic process, the stochastic process is a stationary process or a non-stationary process. In a case where the stochastic process is a stationary process, the communication throughput is stationary; whereas in a case where the stochastic process is a non-stationary process, the communication throughput is non-stationary. In the case where the stochastic process is a stationary process, the expected value of the stochastic process is constant without depending on time, and intertemporal covariance depends only on time difference. If the stochastic process is not a stationary process, the stochastic process is a non-stationary process.

In the present embodiment, the stationarity of the communication throughput is determined based on the compatibility of a model. Specifically, a model of the stationary process and a model of the non-stationary process are selected, and it is determined which model the time-series data of the communication throughput serving as the target of determination is more compatible with.

The respective models of the stationary process and the non-stationary process may be selected by a desired method. The following describes a case where the model of the stationary process and the model of the non-stationary process are selected from an autoregression (AR) process, for example.

The AR process is a stochastic process in which the time-series data xt at the time t is expressed by Equation (2) with p pieces of time-series data (xt-1, xt-2, . . . , xt-p) before the time t and an error term (∈t). ϕ1, ϕ2, . . . ϕp included in Equation (2) are coefficients.

[Equation 2]

$$x_t = \phi_1 x_{t-1} + \phi_2 x_{t-2} + \ldots + \phi_p x_{t-p} + \epsilon_t \qquad (2)$$

The stochastic process expressed by Equation (2) is frequently referred to as an AR(p) model with particular emphasis put on the use of the last p pieces of data. In the description of the present embodiment, the stochastic process expressed by Equation (2) is referred to as an "AR(p) model". In the condition used to make AR(p) a stationary process in the AR(p) model, all the absolute values of the roots (solutions) of the algebraic equation in terms of λ expressed by Equation (3), which is called a characteristic equation, are larger than 1.

[Equation 3]

$$1 - \phi_1\lambda - \phi_2\lambda^2 - \ldots - \phi_p\lambda^p = 0 \qquad (3)$$

Assuming that the communication throughput is a stochastic process, and the stochastic process is an AR(p) process, the stationarity determining unit 102 determines whether the absolute values of all the roots of Equation (3), which is a characteristic equation, are larger than 1.

Even if the communication throughput is assumed to be AR(p), however, the coefficients ϕ1, ϕ2, . . . ϕp are unknown. As a result, the characteristic equation cannot be formulated in the first place. The following describes a method for determining the stationarity with a technique called a unit root test.

To simplify the argument, AR(1) is used as a model of the stochastic process in the description below. The stochastic process model assumed in this case is expressed by Equation (4).

[Equation 4]

$$(1 - \rho L)(x_t - \xi) = \epsilon_t \qquad (4)$$

L denotes a lag operator. By multiplying L, time-series data is shifted to time-series data of one piece before like Lxt=xt−1. (∈t) denotes an error term of N(0, σ∈2), and ξ denotes a constant term. In other words, deviation from the constant term is based on AR(1) in the model. ρ denotes the coefficient of AR(1) and corresponds to ϕ1 in Equation (2) (ϕ2 and those subsequent thereto are 0). Equation (4) can be expanded to be expressed by Equation (5).

[Equation 5]

$$x_t = \xi(1 - \rho) + \rho x_{t-1} - \epsilon_t \qquad (5)$$

The characteristic equation is expressed by 1−ρλ=0, and the root is expressed by λ=1/ρ (assuming that ρ≠0 is satisfied). In the condition used to make AR(1) in Equation (4) a stationary process, the absolute value of the root 1/ρ of the characteristic equation is larger than 1, that is, −1<ρ<1 (ρ≠0) is satisfied. By contrast, if ρ≥1 or ρ≤−1 is satisfied, AR(1) is a non-stationary process.

In a case where the root of the characteristic equation satisfies ρ=1 in the non-stationary process, the equation has a unit root. In the case where ρ=1 is satisfied, Equation (5) can be expressed by Equation (6), which is called a unit root model. In particular, assuming that the unit root model is a continuous-time function, the model corresponds to a Brownian motion model.

[Equation 6]

$$x_t = x_{t-1} + \epsilon_t \qquad (6)$$

By contrast, in a case where |ρ|>1 is satisfied, AR(1) is a diffusion process in which xt diffuses infinitely. The communication throughput, however, does not diffuse infinitely. Thus, the present embodiment provided to predict the communication throughput simply needs to consider the unit root model satisfying ρ=1 as the non-stationary model.

In other words, the stationarity determining unit 102 simply needs to determine whether ρ=1 is satisfied (with a unit root, that is, non-stationary) or ρ<1 is satisfied (with no unit root, that is, stationary). In the unit root test, the determination is made by performing a statistical hypothesis test. The following specifically describes the test.

To perform the test, it is necessary to form a null hypothesis (H0) and an alternative hypothesis (H1). Let us assume that a null hypothesis that "a unit root is present" is tested against an alternative hypothesis that "no unit root is present". In other words, the test question is "H0: ρ=1 vs. H1: ρ<1".

Assuming that difference operators are defined as Δ=1−L, δ=ρ−1, and ξ(1−ρ)=a, Equation (5) can be expressed by Equation (7).

[Equation 7]

$$\Delta x_t = a + \delta x_{t-1} + \epsilon_t \qquad (7)$$

Thus, the test question can also be expressed by "H0: δ=0 vs. H1: δ<0".

According to the null hypothesis H0, δ=a=0 is satisfied. Assuming that M0 denotes the stochastic process model based on the null hypothesis H0, and M1 denotes the stochastic process model based on the alternative hypothesis H1, Equation (8) is derived.

[Equation 8]

$$M_0: \Delta x_t = \epsilon_t$$

$$M_1: \Delta x_t = a + \delta x_{t-1} + \epsilon_t (\delta < 0) \qquad (8)$$

Figure 3:
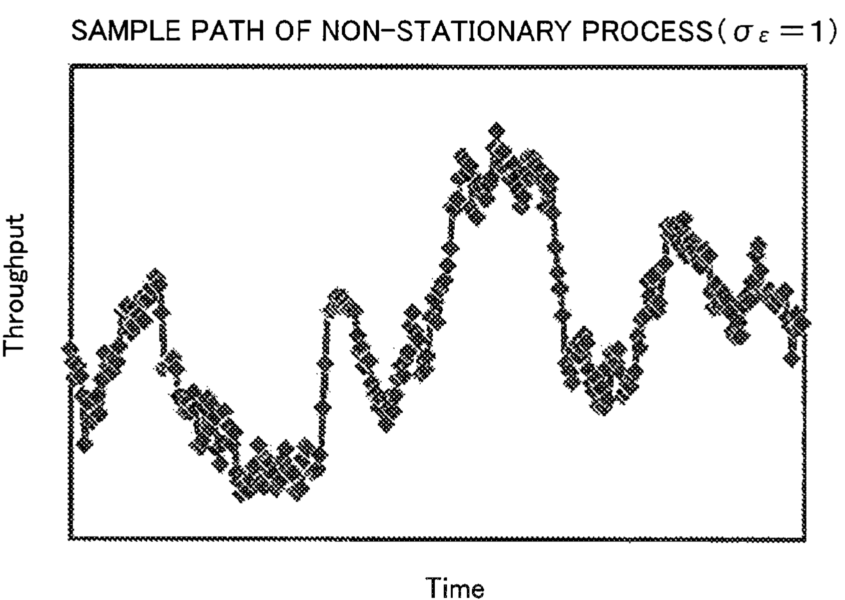
FIG. 3 is a diagram of a sample path ($\sigma\epsilon=1$) of a non-stationary process used to explain the embodiment of the present invention.
Figure 4:
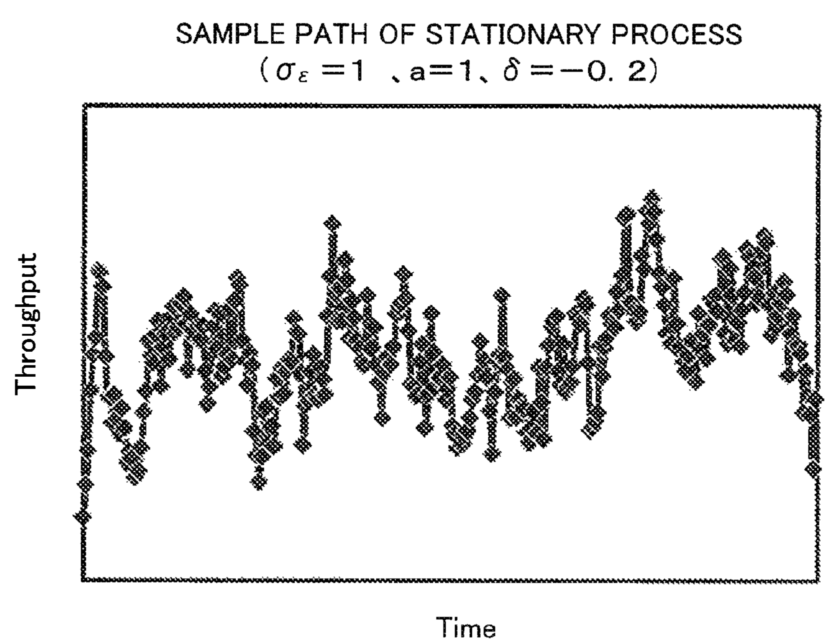
FIG. 4 is a diagram of a sample path ($\sigma\epsilon=1$, $a=1$, $\delta=-0.2$) of a stationary process used to explain the embodiment of the present invention.

Examples of sample paths of M0 and M1 are illustrated in FIGS. 3 and 4, respectively. FIG. 3 is a diagram of a sample path satisfying (σ∈=1) based on M0. FIG. 4 is a diagram of a sample path satisfying (σ∈=1, a=1, δ=−0.2) based on M1.

The following describes a specific test method performed when the time-series data (x1, x2, x3, . . . , xT) is measured. Assuming that Equation (7) is satisfied, and a^ and δ^ denote least-squares estimations (LSE) of a and δ, respectively, the LSEs are expressed by Equation (9). Σ denotes the sum from t=2 to t=T.

[Equation 9]

$$\begin{bmatrix} \hat{a} \\ \hat{\delta} \end{bmatrix} = \begin{bmatrix} \sum 1 & \sum x_{t-1} \\ \sum x_{t-1} & \sum x_{t-1}^2 \end{bmatrix}^{-1} \begin{bmatrix} \sum \Delta x_t \\ \sum x_{t-1}\Delta x_t \end{bmatrix} \qquad (9)$$

A standard error s.e. (δ^) of δ^ is expressed by Equation (10).

[Equation 10]

$$s.e.^2\ (\hat{\delta}) = \frac{\sum(\Delta x_t - \hat{a} - \hat{\delta}x_{t-1})^2}{\begin{vmatrix} \sum 1 & \sum x_{t-1} \\ \sum x_{t-1} & \sum x_{t-1}^2 \end{vmatrix}} \tag{10}$$

As a result, a t statistic tδ of δ^ is expressed by Equation (11).

[Equation 11]

$$t_\delta = \frac{\hat{\delta}}{s.e.(\hat{\delta})} \tag{11}$$

Figure 6:
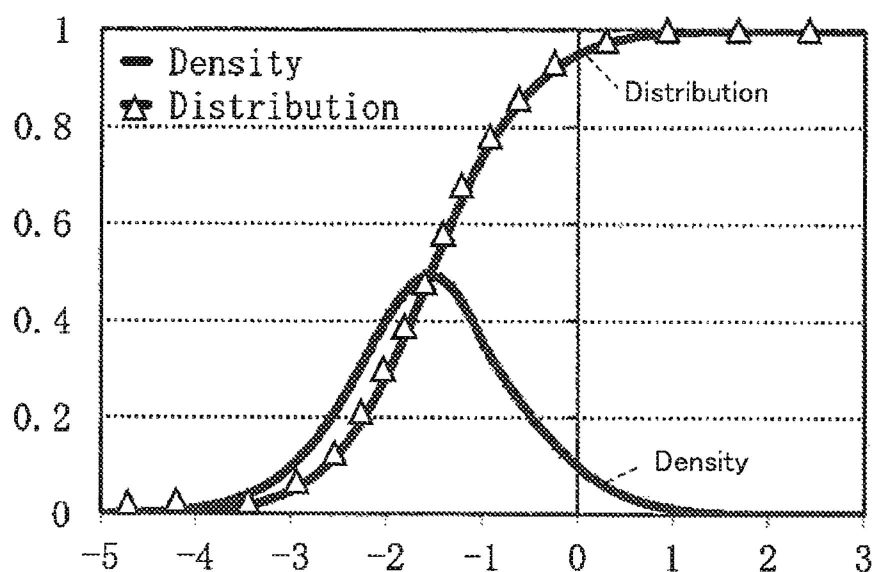
FIG. 6 is a diagram of an example of null distribution ($T=25$) used to explain the embodiment of the present invention.

If the t statistic tδ of δ^ is calculated, p is derived from null distribution of tδ (probability distribution on the assumption that the null hypothesis δ=0 is satisfied). FIG. 5 illustrates characteristic values of the null distribution calculated by the Monte Carlo simulation. FIG. 6 illustrates a density function and a distribution function of the null distribution in a case where T=25 is satisfied.

If p is derived from the null distribution, it is determined whether to reject the null hypothesis and adopt the alternative hypothesis or to accept the null hypothesis at a set significance level.

The unit root test described above was performed on the two sample paths illustrated in FIGS. 3 and 4, for example. In the sample path created based on M0 (FIG. 3), the t statistic tδ=−1.80 was satisfied, and p was 0.39. In other words, the null hypothesis that a unit root is present is accepted at any significance level of 1, 5, and 10%. By contrast, in the test performed on the sample path created based on M1 (FIG. 4), the t statistic tδ=−5.77 was satisfied, and p was smaller than 0.01. In other words, the null hypothesis is rejected, and the alternative hypothesis that no unit root is present is adopted at a significance level of 1%. The unit root test described above is a test method typically called the Dickey-Fuller (DF) test. As indicated by Equation (4), the test was a model in which deviation from the constant term ξ is based on AR(1) among DF tests. Alternatively, the DF test may employ deviation not from the constant term but from a linear expression ξ+ξt relating to the time t. In this case, the two models M0 and M1 to be tested are expressed by Equation (12).

[Equation 12]

$$M_0{:}\Delta x_t = a + \epsilon_t$$

$$M_1{:}\Delta x_t = a + bt + \delta x_{t-1} + \epsilon_t (\delta < 0) \tag{12}$$

While a parameter for calculating the t statistic tδ is added, the procedure is the same as that in the case of deviation from the constant term described above. It should be noted that the null distribution is different.

While the DF test employs AR(1) as a model, there is a test that expands the model to AR(p). The test is called the augmented Dickey-Fuller (ADF) test, and Equation (7) is expanded to be Equation (13).

[Equation 13]

$$\Delta x_t = a + \delta x_{t-1} + \psi_1 \Delta x_{t-1} + \ldots + \psi_p \Delta x_{t-p+1} \epsilon_t \tag{13}$$

The ADF test is the same as the DF test except that parameters ψ1, . . . , ψp are added. The ADF test is performed by the same procedure as that of the DF test and has the same null distribution of the t statistic tδ as that of the DF test. Similar to the DF test, the ADF test may employ deviation not from the constant term but from the linear expression ξ+ξt relating to the time t.

Besides these tests, many unit root tests are known, including the Phillips-Perron (PP) test that expands the model not to AR(p) but to a typical linear process, the Kwiatowski, Phillips, Schmidt and Shin (KPSS) test that switches the null hypothesis and the alternative hypothesis, the locally best invariant (LBI) test, which is a local optimum test, the locally best invariant and unbiased (LBIU) test that provides unbiasedness to the LBI test, and the augmented Dickey-Fuller—generalized least squares method (ADF-GLS) test, which is a modification of the ADF test. Any one of the unit root tests may be used.

Regardless of which unit root test is employed out of these unit root tests, the stationarity determining unit 102 determines "to accept the fact that the process is a non-stationary process (accept the presence of a unit root)" or "to adopt the fact that the process is a stationary process (adopt the absence of a unit root)" based on the supplied time-series data. In a case where the null hypothesis and the alternative hypothesis are switched as in the KPSS test, however, the stationarity determining unit 102 determines "to accept the fact that the process is a stationary process (accept the absence of a unit root)" or "to adopt the fact that the process is a non-stationary process (adopt the presence of a unit root)".

As described above, the use of any one of the exemplified unit root tests makes it possible to determine the stationarity. If there is temporal and physical leeway to further perform arithmetic processing in the environment where the present embodiment is actually operated, two or more unit root tests may be combined to determine the stationarity, thereby determining the stationarity more accurately.

A first unit root test and a second unit root test the type of which is different from that of the first unit root test may be performed, for example. Only when both of the tests reject the null hypothesis (a unit root is present) and adopt the alternative hypothesis (no unit root is present), the stationarity determining unit 102 may adopt the alternative hypothesis (no unit root is present) as a conclusion. Alternatively, three or more unit root tests may be performed, and the stationarity determining unit 102 may derive a conclusion based on the combination of the test results.

Based on the determination made by the stationarity determining unit 102, the prediction model identifying unit 103 identifies a prediction model used to predict stochastic diffusion of the communication throughput. The following describes a specific method for identifying a prediction model.

In the explanation, the stationarity determining unit 102 performs the DF test on the two models in Equation (8), and a prediction model is identified based on the determination result.

An explanation will be made of a case where the stationarity determining unit 102 determines to "accept the fact that the process is a non-stationary process (accept the presence of a unit root)". In this case, the prediction model identifying unit 103 uses the non-stationary process model (unit root model) indicated by M0 in Equation (8) as the prediction model. The expression identical to M0 in Equation (8) is provided below as Equation (14) for the convenience of explanation.

[Equation 14]

$$M_0{:}\Delta x_t = \epsilon_t \tag{14}$$

Dispersion σϵ2 in the error term Et is the only unknown parameter in the model. In other words, the prediction model identifying unit 103 simply needs to identify σϵ2. The LSE of σϵ2 taken when the time-series data (x1, x2, x3, . . . , xT) is measured is expressed by Equation (15).

[Equation 15]

$$\hat{\sigma}_{\varepsilon_t} = \frac{1}{T-1}\sum_{t=2}^{T}(\Delta x_t)^2 \tag{15}$$

Because the unknown parameter is only σϵ2, calculation of Equation (15) can identify the prediction model.

An explanation will be made of a case where the stationarity determining unit 102 determines to "accept the fact that the process is a stationary process (accept the absence of a unit root)". In this case, the prediction model identifying unit 103 uses the stationary process model indicated by M1 in Equation (8) as the prediction model. The expression identical to M1 in Equation (8) is provided below as Equation (16) for the convenience of explanation.

[Equation 16]

$$M_1: \Delta x_t = a + \delta x_{t-1} + \epsilon_t (\delta < 0) \tag{16}$$

Unknown parameters in the model are three parameters of a, δ, and σϵ2. The estimates of a and 6 of these parameters, however, are already calculated as indicated by Equation (9) to perform the unit root test. Therefore, the use of the values in Equation (9) makes it unnecessary to re-estimate the values of a and δ. Although σϵ2 still remains unknown, the LSE thereof can be calculated from Equation (17). The division by T−1−2=T−3 is made in Equation (17) because inclusion of the two parameters of a and δ reduces the degree of freedom by two.

[Equation 17]

$$\hat{\sigma}_{\varepsilon} = \frac{1}{T-3}\sum_{t=2}^{T}\left(\Delta x_t - \hat{a} - \hat{\delta} x_{t-1}\right)^2 \tag{17}$$

The sum of squares on the right-hand side in Equation (17) is already calculated in Equation (10). The use of the sum of squares calculated in Equation (10) can reduce the amount of calculation of this part. Thus, the prediction model of the stationary process model is identified.

Based on the prediction model identified by the prediction model identifying unit 103, the stochastic diffusion calculating unit 104 calculates stochastic diffusion.

The following describes the concept of stochastic diffusion and the method for calculating the stochastic diffusion.

Figure 7:
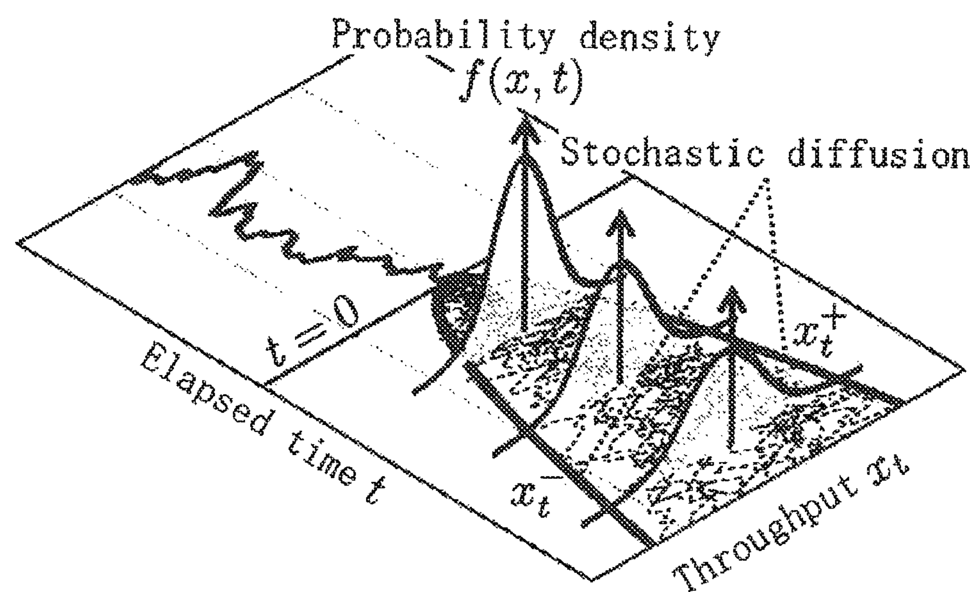
FIG. 7 is a schematic of stochastic diffusion used to explain the embodiment of the present invention.

The concept of stochastic diffusion will be described with reference to FIG. 7. FIG. 7 is a schematic of a relation between a temporal change in the communication throughput and stochastic diffusion.

The solid line on the left indicates past time-series data. The dotted line on the right indicates a part of an infinite number of possibilities of prospective time-series data.

Naturally, a communication throughput in nearer future is more likely to have a value closer to that of the communication throughput at the present time. By contrast, the value of a communication throughput in more distant future is unpredictable, whereby the probability widely spreads. The temporal spread of the probability distribution is indicated by three probability density functions each having an arch shape. By connecting standard deviation (1σ) in the density functions, a parabolic curve (stochastic diffusion) in the lateral direction is obtained. The function of the curve indicates the concept of stochastic diffusion.

The following defines stochastic diffusion more precisely. In a case where the prediction model is the stochastic process expressed by Equation (8) and Equation (12), the stochastic process is the Gaussian process. The probability of being a communication throughput x after the time t corresponds to the Gaussian distribution (normal distribution). In other words, the probability density function f(x,t) of the time t and the communication throughput x is expressed by Equation (18).

[Equation 18]

$$f(x, t) = \frac{1}{\sqrt{2\pi\sigma_t^2}}\exp\left(-\frac{(x-\mu_t)^2}{2\sigma_t^2}\right) \tag{18}$$

In the expression, σt and μt are functions of t and vary depending on the prediction model (which will be described later in detail). FIG. 7 illustrates two upper and lower stochastic diffusions. The stochastic diffusions are denoted by xt+ and xt−, respectively, and defined by Equation (19).

[Equation 19]

$$x+/t = \mu_t \pm \alpha\sigma_t \tag{19}$$

In the expression, α is a constant. While FIG. 7 illustrates a case where α=1 is satisfied, α may be any integer. In a case where α=3 is satisfied, for example, the value is within a range of (−3σ, 3σ) in the Gaussian distribution. This indicates that the communication throughput xt falls within (xt+, xt−) in an area of 99.7% at 3σ.

Thus, the processing performed by the stochastic diffusion calculating unit 104 corresponds to calculation of xt±. Furthermore, the stochastic diffusion calculating unit 104 may calculate σt and μt for each prediction model.

Subsequently, σt and μt in the non-stationary model (unit root) M0 in Equation (14) are calculated. In the non-stationary model (unit root) M0, σt and μt are expressed by Equations (21) and (20), respectively.

[Equation 20]

$$\mu_t = x_0 \tag{20}$$

[Equation 21]

$$\sigma_t = \sigma_\epsilon\sqrt{t} \tag{21}$$

By contrast, σt and μt in the stationary model M1 in Equation (16) are expressed by Equations (23) and (22), respectively. Note that ρ=δ+1 is satisfied.

[Equation 22]

$$\mu_t = \rho^t x_0 + \frac{a(1-\rho^t)}{1-\rho} \tag{22}$$

-continued

[Equation 23]

$$\sigma_t = \sigma_\varepsilon \sqrt{\frac{1-\rho^{2t}}{1-\rho^2}} \tag{23}$$

Figure 8:
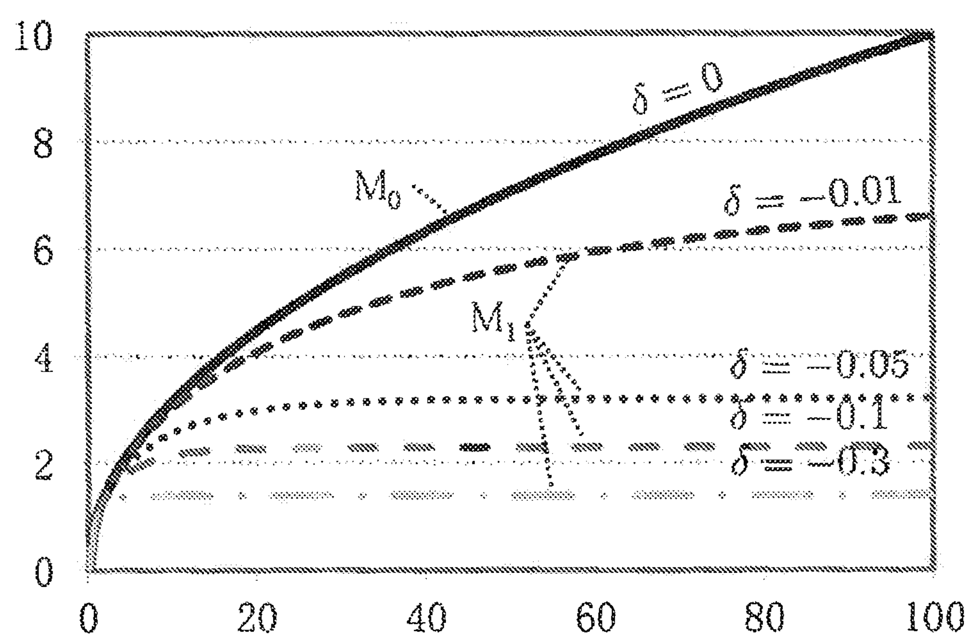
FIG. 8 is a diagram of stochastic diffusion in each prediction model used to explain the embodiment of the present invention.

FIG. 8 is a diagram of a difference in the stochastic diffusion between the non-stationary model and the stationary model. FIG. 8 illustrates xt+ in a case where μt=0 and α=1 are satisfied in Equation (19) in the non-stationary model M0 and the stationary model M1 (δ=−0.01, −0.05, −0.1, and −0.3). It is found that the stochastic diffusion of the non-stationary model increases most significantly. As δ is closer to 0, the stationary model is closer to the non-stationary model. As δ decreases (as the absolute value increases), the stochastic diffusion decreases.

Figure 9:
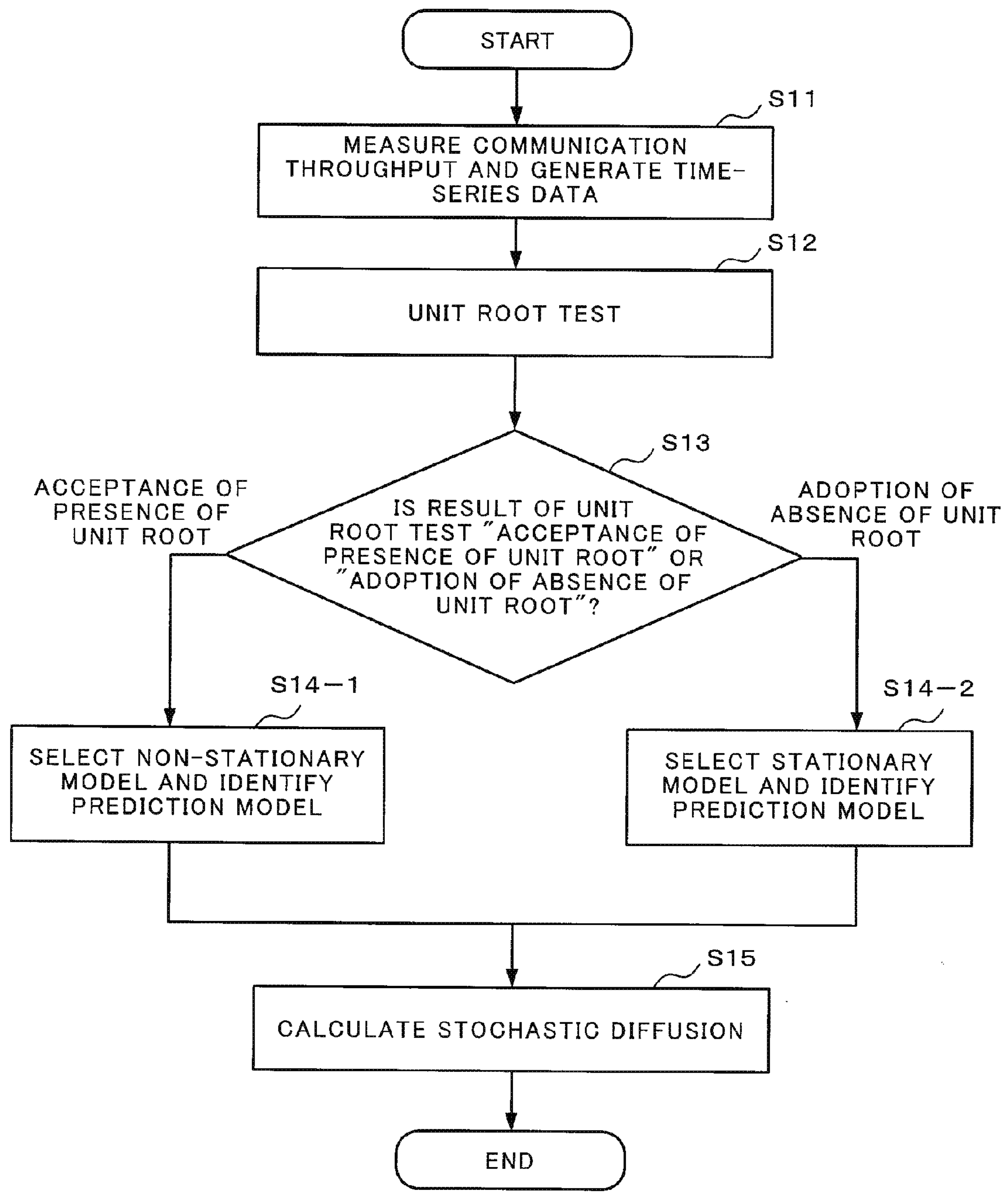
FIG. 9 is a flowchart of a basic operation of the throughput prediction device according to the embodiment of the present invention.

The following describes an operation performed by the communication throughput prediction device 100 with reference to the flowchart in FIG. 9.

The communication throughput measuring unit 101 measures the communication throughput of transmitted data of the IP network 200 at a time interval τ. The communication throughput measuring unit 101 holds the measured communication throughput as time-series data (Step S11).

Based on part of the time-series data held at Step S11, the stationarity determining unit 102 performs a unit root test, thereby determining the stationarity (Step S12). The stationarity determining unit 102 notifies the prediction model identifying unit 103 of the determination result.

If it is determined that a unit root is present ("acceptance of the presence of a unit root" at Step S13), the prediction model identifying unit 103 selects a non-stationary model as the prediction model and identifies parameters of the prediction model (Step S14-1). After the identification, the system control goes to Step S15.

By contrast, if it is determined that no unit root is present ("adoption of the absence of a unit root" at Step S13), the prediction model identifying unit 103 employs a stationary model as the prediction model and identifies parameters of the prediction model (Step S14-2). After the identification, the system control goes to Step S15.

Finally, based on the result of identification made at Step S14-1 or Step S14-2, the stochastic diffusion calculating unit 104 calculates the stochastic diffusion of the communication throughput (Step S15).

As described above, the present embodiment can predict stochastic diffusion of a communication throughput at higher accuracy. This is because the present embodiment determines, before the prediction of the stochastic diffusion, whether the state of the communication throughput is stationary or non-stationary and identifies parameters of a stochastic process model defining the communication throughput as a stochastic variable based on the determined state.

The following describes how much the method for predicting stochastic diffusion of a communication throughput according to the present embodiment can increase the prediction accuracy with reference to the specific examples illustrated in FIGS. 10 to 15. In the explanation, the method is compared with the typical method for predicting stochastic diffusion of a communication throughput described in Non Patent Literature 1.

Figure 10:
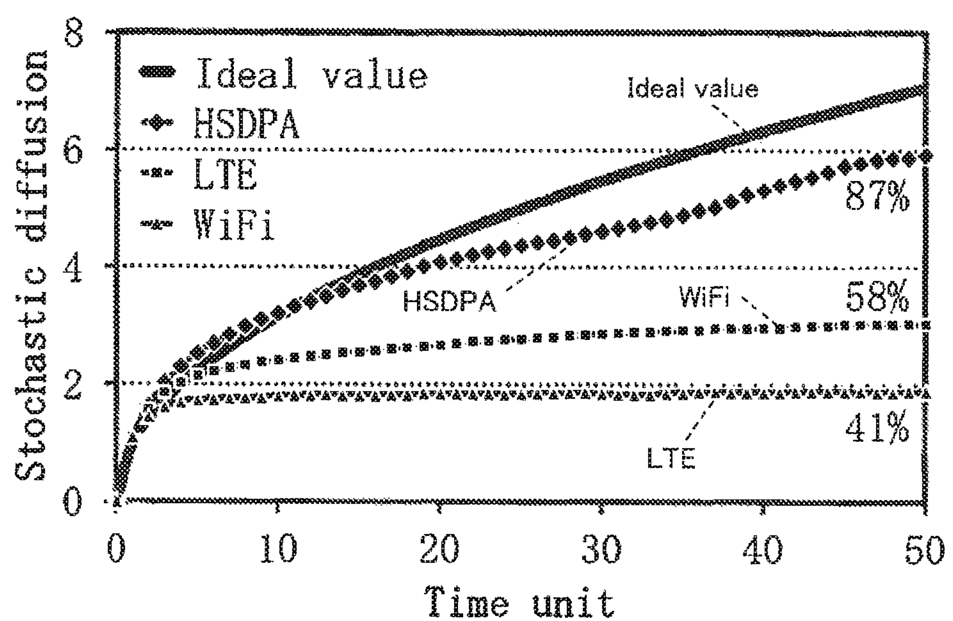
FIG. 10 is a diagram of prediction results in a typical method (using the Brownian motion model alone) used to explain the embodiment of the present invention.

FIG. 10 illustrates prediction accuracy of prediction made by the method for predicting stochastic diffusion described in Non Patent Literature 1 about stochastic diffusion of three communication throughputs, which are a communication throughput taken when a file located in a server on the Internet is downloaded via HSDPA, a communication throughput via Long Term Evolution (LTE), and a communication throughput via WiFi.

The curve represented by Ideal value indicates the stochastic diffusion in an ideal Brownian motion (identical to the unit root model expressed by Equation (20) and Equation (21)). The curve represented by HSDPA indicates the stochastic diffusion of the communication throughput measured via HSDPA. The curve represented by LTE indicates the stochastic diffusion of the communication throughput measured via LTE. The curve represented by WiFi indicates the stochastic diffusion of the communication throughput measured via WiFi.

The results of the predicting stochastic diffusion showed that the stochastic diffusion of the communication throughputs are closer to the ideal stochastic diffusion in order of HSDPA, LTE, and WiFi and that the prediction accuracy thereof is 87%, 58%, and 41%, respectively.

As described above, the typical technology can predict the stochastic diffusion of the communication throughput in HSDPA at relatively high accuracy. The typical technology, however, has lower accuracy in prediction of the stochastic diffusion of the communication throughput via other networks, such as LTE and WiFi. The reason of this phenomenon will be described with reference to FIGS. 11 and 12.

Figure 11:
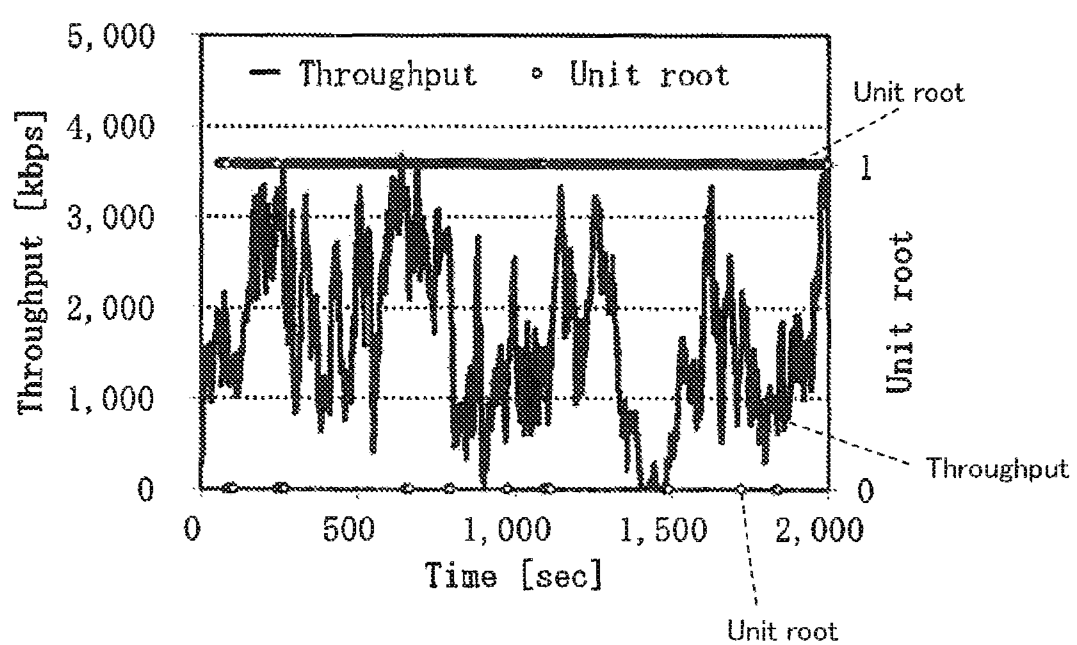
FIG. 11 is a diagram of an example of a communication throughput in HSDPA and results of a unit root test used to explain the embodiment of the present invention.

FIG. 11 is a diagram of an example of a communication throughput (at a time interval of two seconds, that is, τ=2 in Equation (1)) in HSDPA (Throughput: left axis) and results of a unit root test based on 50 pieces of time-series data (T=50) (Unit root: right axis).

The unit root test was performed by the DF test. In the case of accepting the presence of a unit root, 1 is plotted; whereas in the case of adopting the absence of a unit root, 0 is plotted. As is clear from FIG. 11, the presence of a unit root is accepted as most of the results. In other words, a mobile packet network, such as HSDPA, significantly fluctuates because of radio wave interference and cross traffic, and the behavior of the time-series data thereof is a non-stationary process. This increases the prediction accuracy with a typical Brownian motion model (that is, a unit root model).

Figure 12:
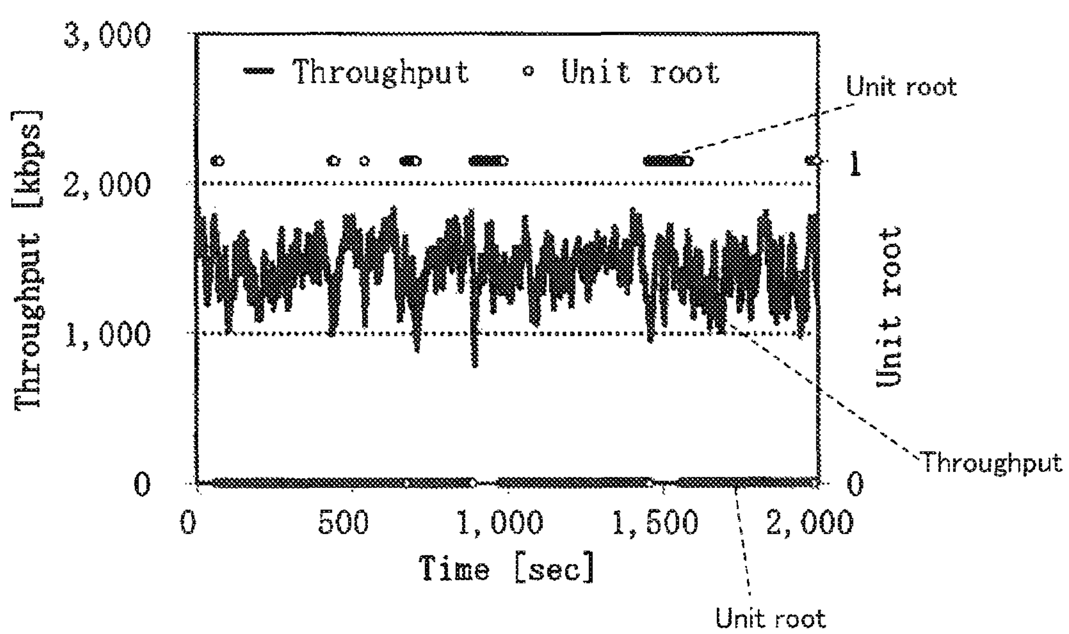
FIG. 12 is a diagram of an example of a communication throughput in WiFi and results of a unit root test used to explain the embodiment of the present invention.

FIG. 12 is a diagram of an example of a communication throughput (at a time interval of two seconds, that is, τ=2 in Equation (1)) in WiFi (Throughput: left axis) and results of a unit root test based on 50 pieces of time-series data (T=50) (Unit root: right axis). As in HSDPA illustrated in FIG. 11, the unit root test was performed by the DF test in WiFi illustrated in FIG. 12. In the case of accepting the presence of a unit root, 1 is plotted; whereas in the case of adopting the absence of a unit root, 0 is plotted.

Unlike the results in HSDPA illustrated in FIG. 11, most of the results of the unit root test adopt the absence of a unit root. In other words, assuming that the communication throughput in WiFi is a stochastic process, the stochastic process is not a non-stationary model (a Brownian motion model, that is, a unit root model) but a stationary model. Therefore, the typical technology selecting a non-stationary process (a Brownian motion model, that is, a unit root model) as the stochastic process has lower prediction accuracy in WiFi and LTE.

It has been explained that, because HSDPA is a mobile packet network, the behavior of the time-series data thereof is a non-stationary process. LTE is the same as HSDPA in terms of being a mobile packet network. The current LTE, however, is used by fewer users with less cross traffic and is designed to be shifted to HSDPA in a poor radio wave environment. As a result, LTE is not so non-stationary as HSDPA. Thus, the typical technology has lower prediction accuracy in LTE than in HSDPA.

Figure 13:
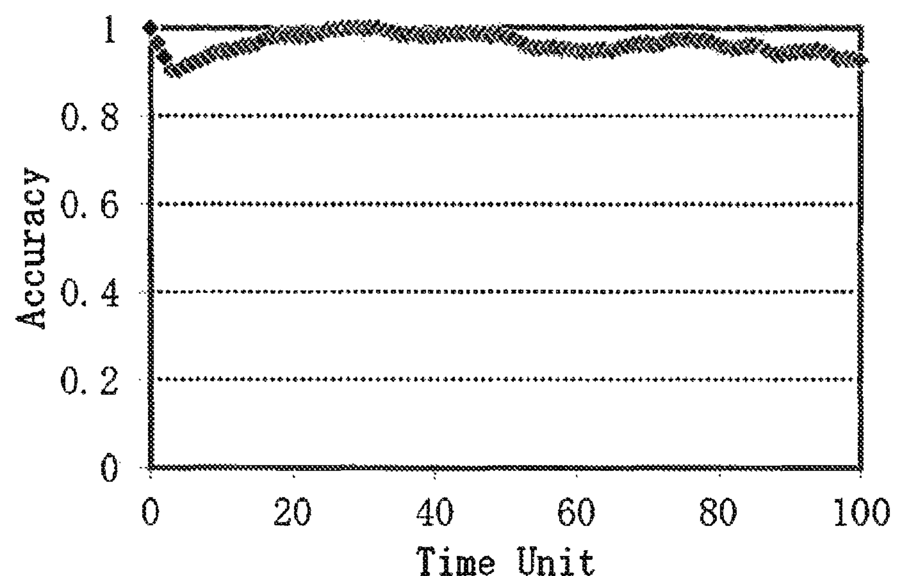
FIG. 13 is a diagram of prediction results (HSDPA) of the communication throughput prediction device according to a first embodiment of the present invention.
Figure 14:
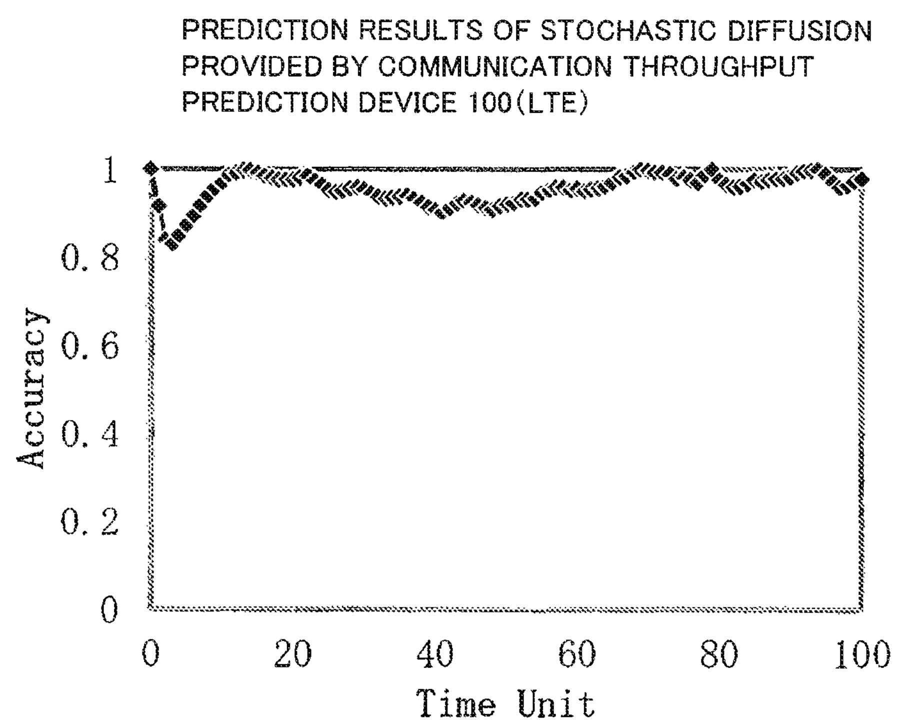
FIG. 14 is a diagram of prediction results (LTE) of the communication throughput prediction device according to the first embodiment of the present invention.
Figure 15:
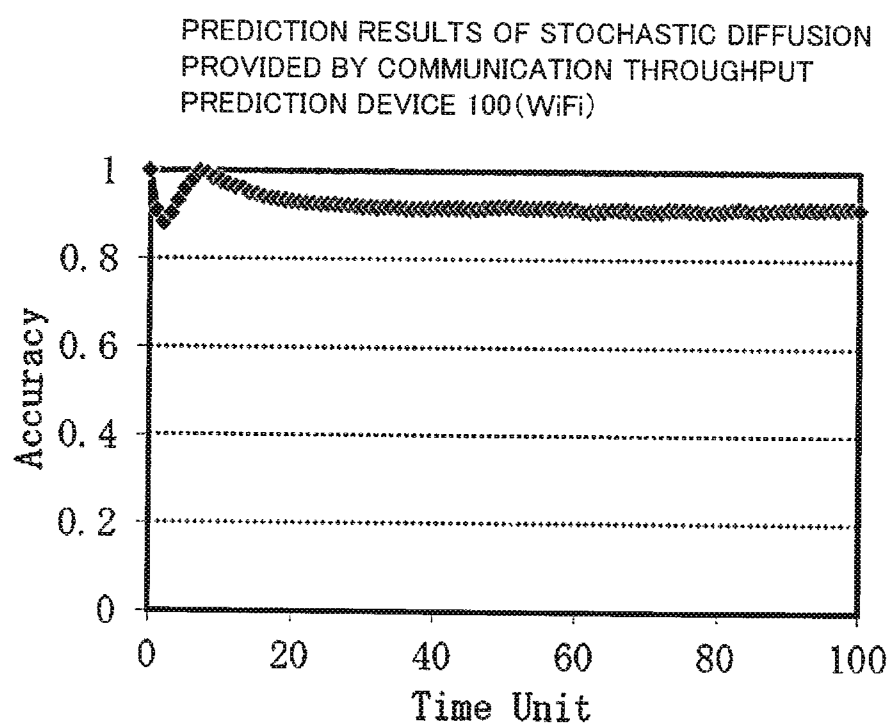
FIG. 15 is a diagram of prediction results (WiFi) of the communication throughput prediction device according to the first embodiment of the present invention.

FIGS. 13 to 15 illustrate the results of prediction made by the communication throughput prediction device 100 according to a first exemplary embodiment about the stochastic diffusion of the three communication throughputs described above.

FIG. 13 is a diagram of the accuracy in prediction of the stochastic diffusion of the communication throughput in HSDPA. FIG. 14 is a diagram of the accuracy in prediction of the stochastic diffusion of the communication throughput in LTE. FIG. 15 is a diagram of the accuracy in prediction of the stochastic diffusion of the communication throughput in WiFi. In all the diagrams, the right axis indicates time t (the unit is t seconds, that is, two seconds) and the accuracy in prediction of the stochastic diffusion at the time.

As described above, the typical technology has higher accuracy in prediction of the stochastic diffusion in HSDPA but has lower accuracy in LTE and WiFi. The throughput prediction device 100 according to the present embodiment can achieve higher accuracy in prediction of the stochastic diffusion not only in HSDPA but also in LTE and WiFi.

This is because the stationarity determining unit 102 according to the present embodiment employs the optimum prediction model to make a prediction.

As described above, the present embodiment can predict stochastic diffusion of a communication throughput at high accuracy regardless of the state of the communication throughput.

The throughput prediction device is provided as hardware, such as an electronic circuit. The functions of the throughput prediction device may be carried out by software or a combination of software and hardware. While the throughput prediction method is performed by hardware, such as an electronic circuit, it may be performed by software or a combination of software and hardware. To be performed by software means to be performed by a computer reading and executing a computer program. The device and the method are provided by installing software in a general server device, for example. An arithmetic processor, such as a central processing unit (CPU), reads software to perform arithmetic processing. The CPU controls various types of hardware based on the results of the arithmetic processing, thereby carrying out the functions of the throughput prediction device.

The computer program is stored in various types of non-transitory computer-readable media and is provided to a computer. Examples of the non-transitory computer-readable medium include various types of tangible storage media. Specifically, examples of the non-transitory computer-readable medium include a magnetic recording medium (e.g., a flexible disk, a magnetic tape, and a hard disk drive), a magneto-optical recording medium (e.g., an magneto-optical disc), a compact disc read only memory (CD-ROM), a CD recordable (CD-R), and a CD rewritable (CD-R/W), and a semiconductor memory (e.g., a mask ROM, a programmable ROM (PROM), an erasable PROM (EPROM), a flash ROM, and a random access memory (RAM)). The computer program may be provided to a computer by various types of transitory computer readable media. Examples of the transitory computer readable medium include electrical signals, optical signals, and electromagnetic waves. The transitory computer readable medium can provide the computer program to a computer via a wired communication path, such as an electric wire and an optical fiber, or wireless communication path.

While the throughput prediction device is individually connected to the network in the example in FIG. 1, the throughput prediction device may be mounted on a communication device, such as a transmitting device, a receiving device, and a relay device, a server device, a terminal device, and a transfer device.

Figure 16:
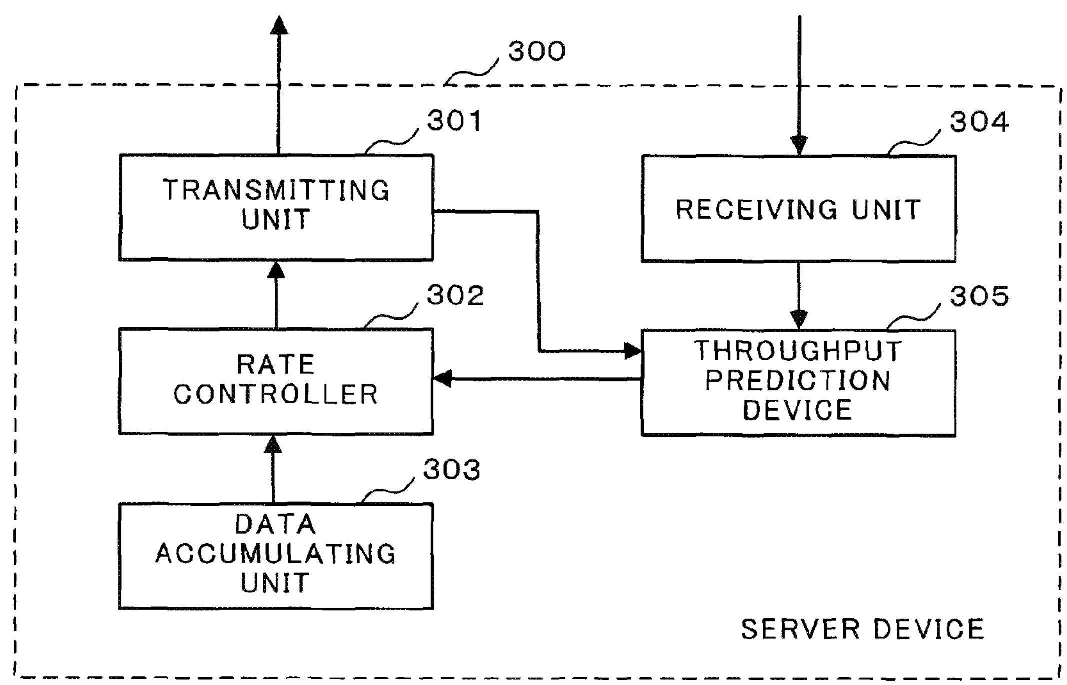
FIG. 16 is a block diagram of an example of a communication device serving as a transmitting device including the throughput prediction device.

FIG. 16 is a block diagram of an example of a communication device serving as a transmitting device including the throughput prediction device. As illustrated in FIG. 16, a communication device 300 includes a transmitting unit 301, a rate controller 302, a data accumulating unit 303, a receiving unit 304, and a throughput prediction device 305. The throughput prediction device 305 has the same configuration as that illustrated in FIG. 2. The transmitting unit 301 of the communication device 300 transmits packets to a receiving device via a network. The receiving device transmits transmission confirmation packets to the receiving unit 304 of the communication device 300 via the network. The receiving unit 304 receives the transmission confirmation packets and transmits them to the throughput device 305. Based on the number of packets transmitted from the transmitting unit 301 and the transmission confirmation packets, the throughput prediction device 305 calculates the number of packets transmitted to the receiving device per unit time via the network, thereby obtaining a communication throughput. The throughput prediction device 305 outputs the calculated stochastic diffusion to the rate controller 302. The rate controller 302 packetizes data accumulated in the data accumulating unit 302. The rate controller 302 controls a transmission rate of the transmission packet based on the stochastic diffusion and outputs the transmission packet to the transmitting unit 301. The data accumulated in the data accumulating unit 303 is stream data, such as video and audio.

The throughput device 305 can predict the stochastic diffusion of the communication throughput at high accuracy. By using the predicted communication throughput, it is possible to prevent reproduction of video data from stopping in the receiving device, reliably distribute the video data, and increase the video quality as much as possible.

Figure 17:
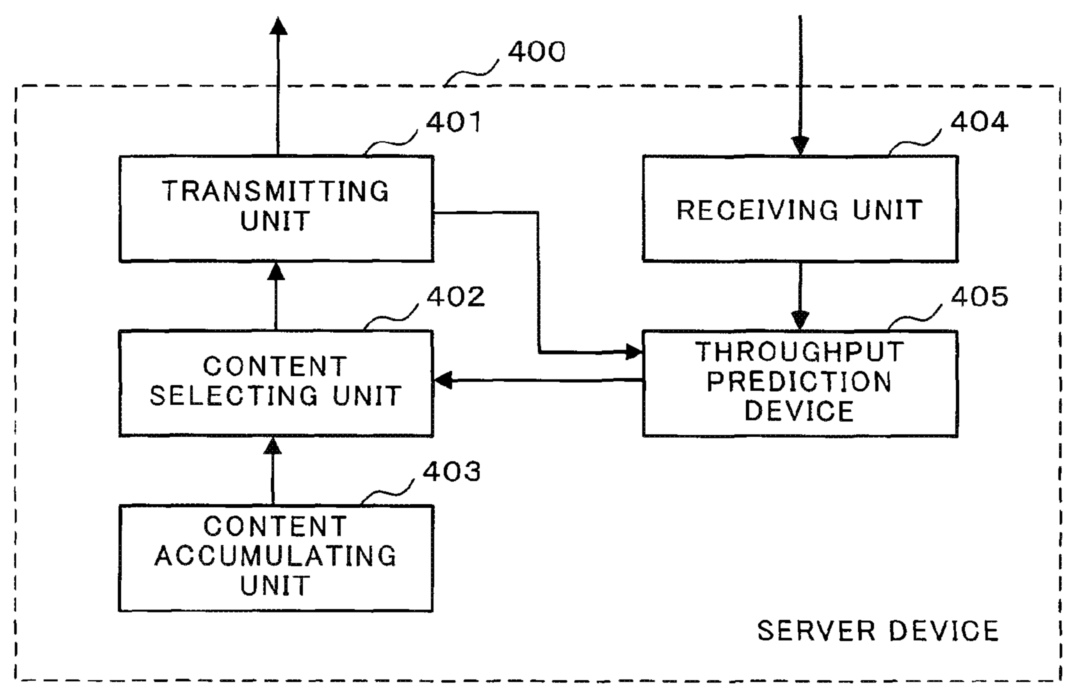
FIG. 17 is a block diagram of an example of a server device including the throughput prediction device.

FIG. 17 is a block diagram of an example of a server device including the throughput prediction device. As illustrated in FIG. 17, a server device 400 includes a transmitting unit 401, a content selecting unit 402, a content accumulating unit 403, a receiving unit 404, and a throughput prediction device 405. The throughput prediction device 405 has the same configuration as that illustrated in FIG. 2. The transmitting unit 401 of the server device 400 transmits a content as packets to a terminal device via a network. The terminal device receives the packets and transmits transmission confirmation packets to the receiving unit 404 of the server device 400 via the network. The receiving unit 404 receives the transmission confirmation packets and transmits them to the throughput prediction device 405. Based on the number of packets transmitted from the transmitting unit 401 and the transmission confirmation packets, the throughput prediction device 405 calculates the number of packets transmitted to the terminal device per unit time via the network, thereby obtaining a communication throughput. The throughput prediction device 405 outputs the calculated stochastic diffusion to the content selecting unit 402. The content accumulating unit 403 accumulates therein content data, such as a text, an image, and video. The content selecting unit 402 selects a content capable of being transmitted to the terminal device within a predetermined time (e.g., within two seconds) with a predetermined probability (e.g., a probability of 95%) based on the stochastic diffusion of the communication throughput out of the content data accumulated in the content accumulating unit 403. The content selecting unit 402 outputs the selected content to the transmitting unit.

The throughput prediction device 405 can predict the stochastic diffusion of the communication throughput at high accuracy. By using the predicted communication throughput, it is possible to reliably transmit the content to the terminal device within a specified time.

Figure 18:
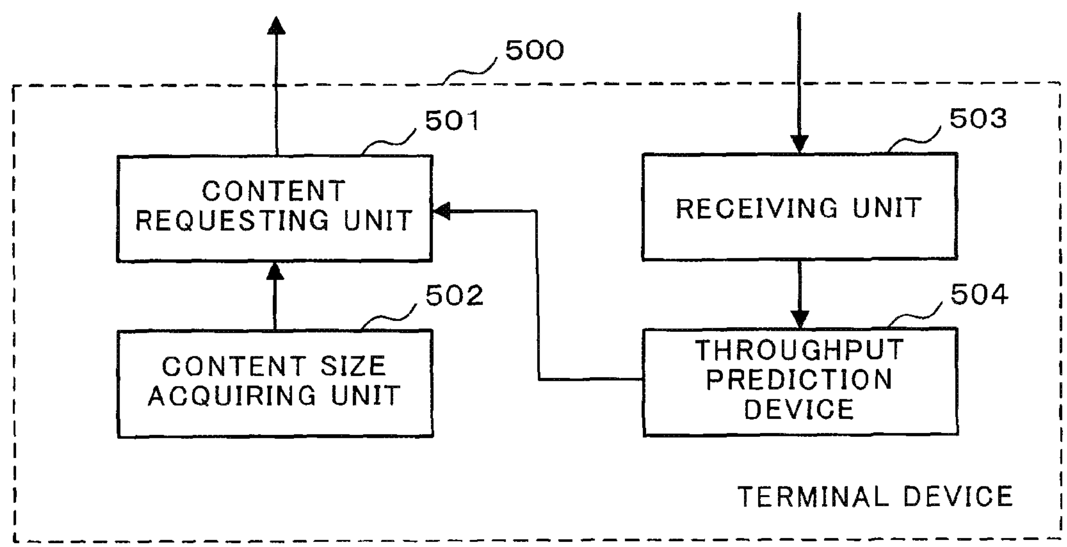
FIG. 18 is a block diagram of an example of a terminal device including the throughput prediction device.

FIG. 18 is a block diagram of an example of a terminal device including the throughput prediction device. As illustrated in FIG. 18, a terminal device 500 includes a content requesting unit 501, a content size acquiring unit 502, a receiving unit 503, and a throughput prediction device 504. The throughput prediction device 504 has the same configuration as that illustrated in FIG. 2. The receiving unit 503 of the terminal device 500 receives a content required by the content requesting unit 501, which will be described later, via a network. The receiving unit 503 transmits communication throughput corresponding to the number of packets received per unit time to the throughput prediction device 504. The throughput prediction device 504 outputs the calculated stochastic diffusion of the communication throughput to the content requesting unit 501. The content size acquiring unit 502 acquires the data size of the content required by the terminal device 500. The content requesting unit 501 requests only a content whose reception can be completed within a predetermined time with a predetermined probability, based on the stochastic diffusion of the communication throughput.

The throughput prediction device 504 can predict the stochastic diffusion of the communication throughput at high accuracy. By using the predicted communication throughput, the terminal device can reliably acquire the content within a specified time.

Figure 19:
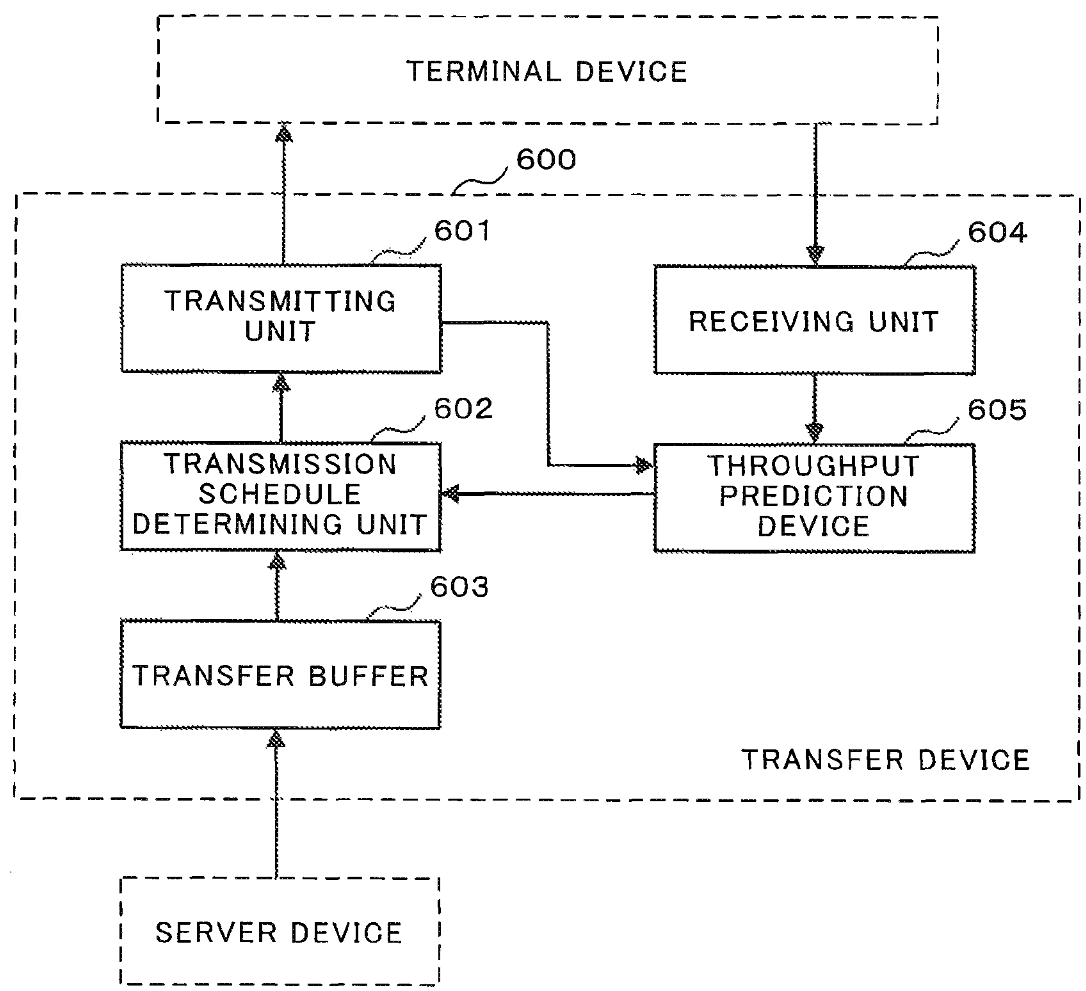
FIG. 19 is a block diagram of an example of a transfer device including the throughput prediction device.

FIG. 19 is a block diagram of an example of a transfer device including the throughput prediction device. As illustrated in FIG. 19, a transfer device 600 includes a transmitting unit 601, a transmission schedule determining unit 602, a transfer buffer 603, a receiving unit 604, and a throughput prediction device 605. The throughput prediction device 605 has the same configuration as that illustrated in FIG. 2. The transfer buffer 603 of the transfer device 600 accumulates therein data to be transferred from a server device to a terminal device as a queue. The queue may be created for each destination terminal device or each flow (data communications having an identical combination of a destination address, a destination port number, a source address, and a source port number). In a case where the queue is created for each terminal device, for example, queues are created by the same number as that of the terminal devices to which the transfer device transfers data. The transmitting unit 601 retrieves packets from the queues in an order determined by the transmission schedule determining unit 602, which will be described later, and transmits them to the corresponding terminal device. The receiving unit 604 receives transmission confirmation packets from the terminal device and transmits them to the throughput prediction device 605. Based on the number of packets transmitted from the transmitting unit 601 and the transmission confirmation packets, the throughput prediction device 605 calculates the number of packets transmitted to the terminal device per unit time via a network, thereby obtaining a communication throughput of each terminal device. The throughput prediction device 605 outputs the calculated stochastic diffusion of the communication throughput of each terminal device to the transmission schedule determining unit 602. Based on the stochastic diffusion of the communication throughput of each terminal device and the queue size of each terminal device in the transmission buffer 603, the transmission schedule determining unit 602 determines a transmission order so as to maximize the number of packets capable of being transmitted within a predetermined time.

The throughput prediction device 605 can predict the stochastic diffusion of the communication throughput at high accuracy. By using the predicted communication throughput, the transfer device can maximize the number of packets capable of being transmitted to the terminal device within a specified time.

While a typical embodiment of the present invention has been described, the invention may be embodied in various forms without departing from the spirit or major characteristics of the invention specified by the claims in the present application. The embodiment above is given by way of example only and is not to be interpreted in a limited way. The scope of the invention is indicated by the claims and is not limited by the description and the abstract. All modifications and changes belonging to equivalents of the claims are included in the scope of the invention.

The present application claims a benefit of priority based on Japanese Patent Application No. 2012-148284 filed on Jul. 2, 2012. The contents of Japanese Patent Application No. 2012-148284 are included in those of the description of the present application.

Part or the whole of the embodiment above can be described by the non-limiting notes below.

(Note 1) A flow rate prediction device including:

a stationarity determining unit that determines, based on time-series data of a measured flow rate, whether a state of the flow rate is stationary or non-stationary;

a prediction model identifying unit that identifies a stochastic process model defining the flow rate as a stochastic variable based on a result of determination made by the stationarity determining unit and calculates a parameter for use in the identified stochastic process model based on the time-series data; and a stochastic diffusion calculating unit that calculates a probability distribution function or a probability density function defining the flow rate to be predicted as the stochastic variable based on the stochastic process model identified by the prediction model identifying unit and the parameter calculated by the prediction model identifying unit.

(Note 2) The flow rate prediction device according to Note 1, further including a measuring unit that measures the time-series data of the flow rate.

(Note 3) The flow rate prediction device according to Note 1 or 2, wherein the stochastic diffusion calculating unit further calculates stochastic diffusion corresponding to stochastic spread of the flow rate to be predicted based on the probability distribution function or the probability density function.

(Note 4) The flow rate prediction device according to any one of Notes 1 to 3, wherein the stationarity determining unit performs a unit root test for the determination of whether the state of the measured flow rate is stationary or non-stationary.

(Note 5) The flow rate prediction device according to any one of Notes 1 to 4, wherein the stochastic process model identified by the prediction model identifying unit is a non-stationary stochastic process model when the stationarity determining unit determines that the state of the measured flow rate is non-stationary, and the stochastic process model identified by the prediction model identifying unit is a stationary stochastic process model different from the non-stationary stochastic process model when the stationarity determining unit determines that the state of the measured flow rate is stationary.

(Note 6) The flow rate prediction device according to any one of Notes 1 to 5, wherein the stochastic process model identified by the prediction model identifying unit is an autoregression (AR) model.

(Note 7) A flow rate prediction method including:

a stationarity determining step of determining, based on time-series data of a measured flow rate, whether a state of the flow rate is stationary or non-stationary;

a prediction model identifying step of identifying a stochastic process model defining the flow rate as a stochastic variable based on a result of determination made in the stationarity determining step and calculating a parameter for use in the identified stochastic process model based on the time-series data; and a stochastic diffusion calculating step of calculating a probability distribution function or a probability density function defining the flow rate to be predicted as the stochastic variable based on the stochastic process model identified in the prediction model identifying step and the parameter calculated in the prediction model identifying step.

(Note 8) A flow rate prediction program causing a computer to function as a flow rate prediction device that predicts a flow rate, the flow rate prediction program causing the computer to function as the flow rate prediction device including:

a stationarity determining unit that determines, based on time-series data of a measured flow rate, whether a state of the flow rate is stationary or non-stationary;

a prediction model identifying unit that identifies a stochastic process model defining the flow rate as a stochastic variable based on a result of determination made by the stationarity determining unit and calculates a parameter for use in the identified stochastic process model based on the time-series data; and a stochastic diffusion calculating unit that calculates a probability distribution function or a probability density function defining the flow rate to be predicted as the stochastic variable based on the stochastic process model identified by the prediction model identifying unit and the parameter calculated by the prediction model identifying unit.

(Note 9) The flow rate prediction device according to any one of Notes 1 to 6, wherein the flow rate prediction device is a communication throughput prediction device.

(Note 10) A communication device including the flow rate prediction device according to Note 9, the communication device including a rate controller that controls a transmission rate based on stochastic diffusion output from the flow rate prediction device.

(Note 11) A server device including the flow rate prediction device according to Note 9, the server device including:

a content accumulating unit that accumulates therein a plurality of pieces of content data; and a content selecting unit that selects a content from the pieces of content data based on stochastic diffusion output from the flow rate prediction device.

(Note 12) A terminal device including the flow rate prediction device according to Note 9, the terminal device including a content requesting unit that requests a content whose reception of which is capable of being completed under a certain condition, based on stochastic diffusion output from the flow rate prediction device.

(Note 13) A transfer device including the flow rate prediction device according to Note 9, the transfer device including:

a transfer buffer that accumulates therein transfer data; and a transmission schedule determining unit that determines a transmission order of the transfer data accumulated in the transfer buffer based on stochastic diffusion output from the flow rate prediction device.

INDUSTRIAL APPLICABILITY

The present invention is suitably used for prediction not only of a flow rate, such as a communication throughput, but also of any flow rate as required (e.g., a traffic volume, a liquid flow rate, and a gas flow rate).

REFERENCE SIGNS LIST

100 throughput prediction device
101 communication throughput measuring unit
102 stationarity determining unit
103 prediction model identifying unit
104 stochastic diffusion calculating unit
200 IP network
300 communication device
400 server device
500 terminal device
600 transfer device

What is claimed is:

1. A flow rate prediction device, the device comprising:

a determining unit configured to determine, based on time-series data of a measured flow rate, whether a state of the flow rate is stationary or non-stationary;

an identifying unit configured to identify a first stochastic process model defining the flow rate as a first stochastic variable if the state of the flow rate is stationary and a second stochastic process model defining the flow rate as a second stochastic variable if the state of the flow rate is non-stationary; and calculates a first parameter for use in the identified first stochastic process model based on the time-series data and a second parameter for use in the identified second stochastic process model based on the time-series data; and a calculating unit configured to calculate a probability distribution function or a probability density function defining a first pedicted flow rate as the first stochastic variable based on the first stochastic process model identified by the identifying unit and the first parameter calculated by the identifying unit, and calculate a probability distribution function or a probability density function defining a second predicted flow rate as the second stochastic variable based on the second stochastic process model identified by the identifying unit and the second parameter calculated by the identifying unit;

wherein the determining unit, the identifying unit, and the calculating unit are each implemented by at least one hardware processor.

2. The device according to claim 1, further comprising a measuring unit is configured to measure the time-series data of the flow rate.

3. The device according to claim 1, wherein the calculating unit further calculates stochastic diffusion corresponding to stochastic spread of the predicted flow rate based on the probability distribution function or the probability density function.

4. The device according to claim 1, wherein the determining unit performs a unit root test for the determination of whether the state of the measured flow rate is stationary or non-stationary.

5. The device according to claim 1, wherein the stochastic process model identified by the identifying unit is a non-stationary stochastic process model when the unit determines that the state of the measured flow rate is non-stationary, and the stochastic process model identified by the identifying unit is a stationary stochastic process model different from the non-stationary stochastic process model when the determining unit determines that the state of the measured flow rate is stationary.

6. The device according to claim 1, wherein the stochastic process model identified by the identifying unit is an autoregression (AR) model.

7. A flow rate prediction method implemented by one or more processors, the method comprising:

determining, based on time-series data of a measured flow rate, whether a state of the flow rate is stationary or non-stationary;

identifying a first stochastic process model defining the flow rate as a first stochastic variable if the state of the flow rate is stationary and a second stochastic process model defining the flow rate as a second stochastic variable if the state of the flow rate is non-stationary;

calculating a first parameter for use in the identified first stochastic process model based on the time-series data and a second parameter for use in the identified second stochastic process model based on the time-series data; and calculating a probability distribution function or a probability density function defining a first predicted flow rate as the first stochastic variable based on the identified first stochastic process model and the first calculated parameter, and calculating a probability distribution function or a probability density function defining a second predicted flow rate as the second stochastic variable based on the identified second stochastic process model and the second calculated parameter.

8. A non-transitory computer readable medium embodying instructions for controlling a device to implement a flow rate prediction method, the flow rate prediction method comprising:

determining, based on time-series data of a measured flow rate, whether a state of the flow rate is stationary or non-stationary;

identifying a first stochastic process model defining the flow rate as a first stochastic variable if the state of the flow rate is stationary and a second stochastic process model defining the flow rate as a second stochastic variable if the state of the flow rate is non-stationary;

calculating a first parameter for use in the identified first stochastic process model based on the time-series data and a second parameter for use in the identified second stochastic process model based on the time-series data; and calculating a probability distribution function or a probability density function defining a first predicted flow rate as the first stochastic variable based on the identified first stochastic process model and the first calculated parameter, and calculating a probability distribution function or a probability density function defining a second predicted flow rate as the second stochastic variable based on the identified second stochastic process model and the second calculated parameter.

9. The device according to claim 1, wherein the probability distribution function or a probability density function is determined by an expected value of the predicted flow rate, and a standard deviation of the flow rate to be predicted.

10. The method according to claim 7, wherein the probability distribution function or a probability density function is determined by an expected value of the predicted flow rate, and a standard deviation of the flow rate to be predicted.

11. The non-transitory computer readable medium according to claim 8, wherein the probability distribution function or a probability density function is determined by an expected value of the predicted flow rate, and a standard deviation of the flow rate to be predicted.

* * * * *